Nov. 6, 1951 G. C. SZIKLAI 2,573,777

TELEVISION SYSTEM

Filed April 24, 1947

INVENTOR.
George C. Sziklai

BY W. S. Grover.

ATTORNEY

Patented Nov. 6, 1951 2,573,777

UNITED STATES PATENT OFFICE 2,573,777

TELEVISION SYSTEM

George C. Sziklai, Princeton, N. J., assignor to Radio Corporation of America, a corporation of Delaware Application April 24, 1947, Serial No. 743,487

11 Claims. (Cl. 178—5.4)

This invention relates to image reproducing systems and more particularly to reproduction in a simultaneous manner of a plurality of component images such as, for example, component color images to produce a composite color image.

As is well known in the television art, the transmission of visual information over electrical circuits such as a radio circuit can be accomplished by analyzing the image into its image elements and deriving therefrom a signal train of impulses by an orderly sequence of scanning. The image may then be reproduced from the electrical signal train by reconstruction in the same orderly sequence of scanning. A multiple image transmission may be accomplished by a sequential or a simultaneous type of transmission.

The sequential system referred to transmits one image or component image at a time in sequence and at a rapidly recurring rate.

The simultaneous system transmits through three separate adjacent or continuous or even discontinuous and spaced signal channels all the images or component images simultaneously. It has been know for many years that the transmission of television images in color may be accomplished by transmitting signals representative of the image in each of a selected number of primary or component colors, which are three in number for a tricolor system or which may include, where desired, a monochrome signal addition known as the key image to sharpen image outline and delineation. For a low degree of fidelity of color representation, even a bicolor system might be adopted. For any of these methods, however, the several produced component color signal series may be transmitted simultaneously when a simultaneous multicolor method is adopted, or they may be transmitted in sequence where a sequential additive method is adopted. For the purpose of reference herein, the three selected component colors will be mentioned as red, green, and blue, although any suitable three colors may be selected with the condition being that all are to add to produce white, and that no two shall add to produce the third color. Of course, the selection is best where the greatest portion of the I. C. I. color triangle is usable.

The transmission of color images by the well known sequential system inherently leads to color action fringes and color flicker, unless the field frequency is raised to a very high value which leads to a requirement for a very broad frequency band for signal transmission.

It becomes apparent that the transmission and reproduction of component color images simultaneously to produce a composite image would eliminate the disadvantages referred to above.

There is, however, one important difficulty in the simultaneous reproduction of component images. It will be remembered that in an additive process of color reproduction, it is essential that the several component color images must be in substantially perfect registry to produce desirable results.

When three separate physical devices are employed, one for each of the component colors, there may be involved difficulties in making optical, electrical, and mechanical alignment which preclude the convenient adjustment for proper registration of the several component images.

According to this invention, a system of image reproduction is employed which alleviates the necessity for repeated adjustment of individual image registry. An image reproducing tube is provided wherein the several component color images are projected in registry on a single screen of the tube.

There have been proposed heretofore several ingenious devices for accomplishing the reproduction of several component images on a single screen of an image reproducing tube. Such a device, for example, has been proposed wherein a screen of an image producing tube is divided into a plurality of elemental areas undiscernible to the unaided eye but selectively characterized to generate a predetermined component color. Such a system, however, is subject to difficulties because of the problems involved in deflection of the electron stream at high velocity.

It is well known in the electronic art that a deflection of an electron beam may be accomplished with greater ease and accuracy when the electron beam is travelling at a relatively low velocity. In the color system heretofore proposed wherein the electron beam is directed selectively to the proper elemental areas of the viewing screen in accordance with the incoming component color image signal train, the deflection of the beam is accompanied by inaccuracies and other difficulties by reason of the fact that, in order to produce a sufficiently brilliant image, the electrons of the beam must be travelling at a rapid rate.

According to this invention, it is not necessary to deflect the electrons after they have been accelerated to a high rate to produce a brilliant image. The required deflection for purposes of forming a scanning raster is accomplished before the image is formed, and after there is formed an electron image representative of the image being transferred, the electrons are accelerated in a manner similar to that known in the art as the electron optics of an image tube.

In my copending application Serial No. 749,190, filed May 20, 1947 entitled "Television System," there has been disclosed a method and means whereby such action has been accomplished by producing a luminescent scanning raster on a photo cathode, from which there is derived an electron image representative of the raster. The modulation of the scanning raster is then accomplished by modulating the electron stream between the photo cathode and the luminescent screen of the image tube.

According to this invention, the scanning raster produces by electronic bombardment an electron image of secondary electrons. The electron flow from the electron image to the associated luminescent screen is modulated by a video signal to produce an intelligence image.

The transmission of stereoscopic images can be accomplished if the identity of the right and left eye views can be maintained throughout transmission and reproduction. The identity can be maintained during transmission by sending right and left eye views separately. Systems of this type have been proposed employing vertical opaque strips whose width and spacing and distance from the image are chosen such that the image, which is made up of alternate vertical strips representative of alternately right and left eye views, will be resolved into a stereoscopic image.

This invention in one of its preferred forms lends itself particularly well to the reproduction of stereoscopic images.

A primary object of this invention is therefore to provide an improved television system.

Another object of this invention is to provide an all-electronic simultaneous type image reproducing system.

Still another object of this invention is to provide for simultaneous color image reproduction which is substantially free from registration difficulties.

Other and incidental objects of the invention will be apparent to those skilled in the art from a reading of the following specification and an inspection of the accompanying drawing in which Figure 1 shows schematically one preferred form of this invention involving the reproduction of television images in monochrome;

Figures 1, 2, 3, 4:
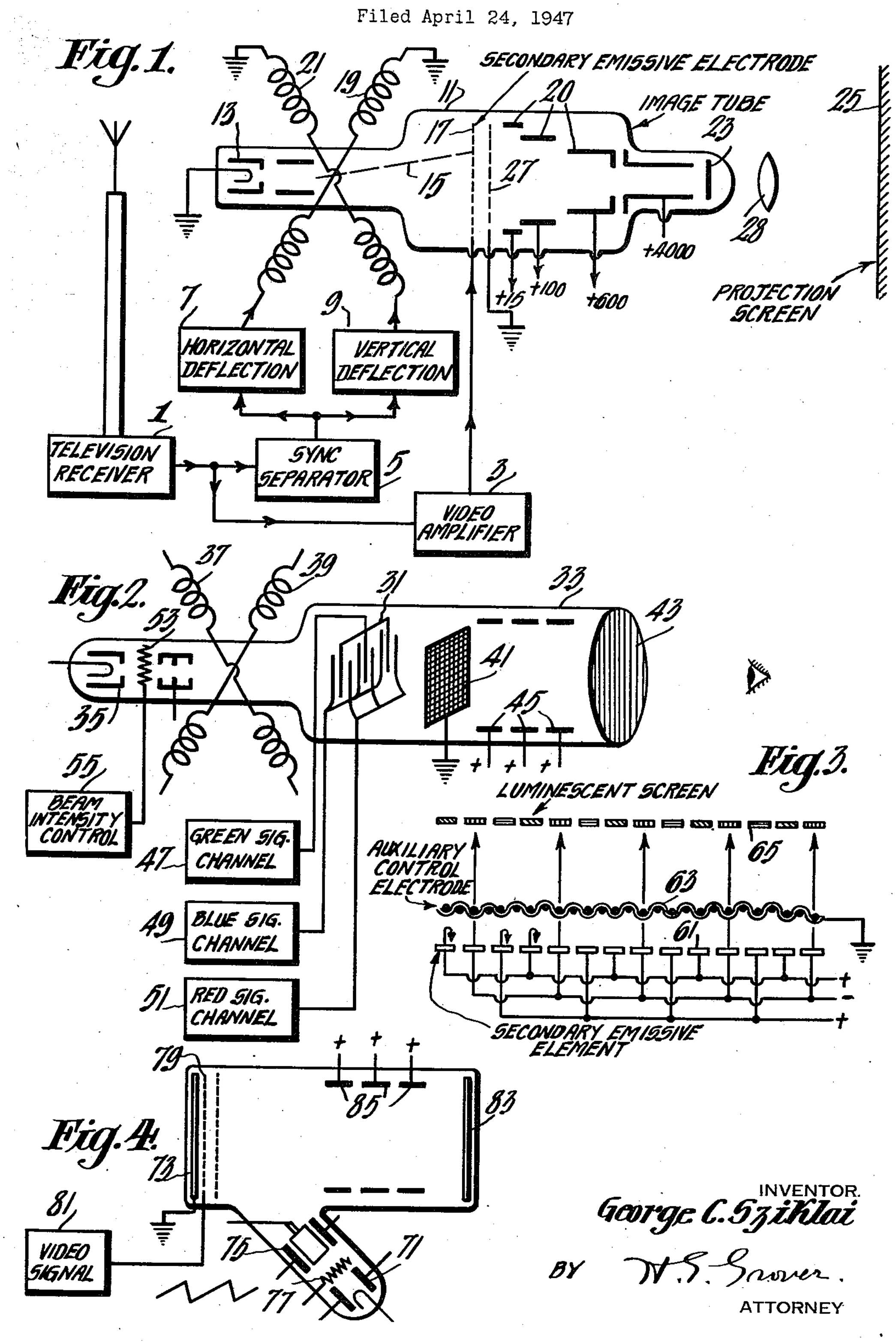
Figure 2 illustrates schematically one preferred form of this invention adaptable to the simultaneous reproduction of component images such as is involved in the simultaneous reproduction of color images.
Figure 3 shows graphically the operation of the simultaneous type of reproduction.
Figure 4 illustrates another form which the image reproducing tube may take.

Turning now in detail to Figure 1, there is shown a television receiver 1, its associated video amplifier 3, a sync separator 5, horizontal deflection generator 7, and vertical deflection generator 9. The receiver and the associated elements may take any of the well known forms such as, for example, that shown in the Carlson Reissue Patent No. 20,700, dated April 19, 1938, or, for instance, that marketed at present by the assignee company and known as Models 630TS and/or 621TS. A sync separator which may be employed to separate the synchronizing signals from the video signals may, for example, be of the type shown and described in the U. S. patent to A. V. Bedford, No. 2,207,775, dated July 16, 1940. The horizontal and deflection signal generators 7 and 9 have been well described in the U. S. patent to W. A. Tolson et al., No. 2,101,520, dated December 7, 1937, or as in the above mentioned now marketed receivers. The patents and apparatus listed are given by way of example only. Any suitable devices for performing the same functions are satisfactory for employment in the practice of this invention.

Video amplifier 3 must, of course, be capable of transmitting a wide frequency band and may take any of the well known forms, such as, for example, the type shown and described in an article entitled "Cathode-Coupled Wide-Band Amplifiers" by G. C. Sziklai and A. C. Schroeder, beginning on page 701 of the "Proceedings of the Institute of Radio Engineers" for October, 1945, or may be of the form disclosed by U. S. patent application of J. C. Achenbach, S. I. Tourshou, and I. Mackey, Serial No. 638,780, filed January 3, 1946, also by way of example.

Tube 11 is provided for the purpose of establishing an electron image of a scanning raster and modulating the electron flow resulting from the electron image to derive from the scanning raster an intelligence image. Tube 11 is provided with an electron gun 13 to produce a cathode ray beam 15, which is caused to scan a secondary emissive electrode element or cathode 17 by horizontal deflection coils 19 and vertical deflection coils 21.

The electron gun is discussed in detail in an article entitled "Factors Governing Performance of Electron Guns in Television Cathode-Ray Tubes" by R. R. Law, beginning on page 103 of the "Proceedings of the Institute of Radio Engineers" for February, 1942, and in an article entitled "Improved Electron Gun for Cathode-Ray Tubes" by L. E. Swedlund in "Electronics" for March, 1945.

Deflection coils 19 and 21 may, for example, take the form shown and described in the U. S. patent to W. A. Tolson, No. 2,167,379, dated July 25, 1939.

The secondary emissive electrode 17 must be of adequate size to receive the scanning raster, and is provided with a structure and made of a material capable of providing adjacent to itself an electron image of the scanning raster by secondary emitted electrons as a result of the electronic bombardment by the cathode ray beam 15.

If electrons are made to impinge on a metallic surface, they produce a copious emission of electrons from the metallic surface. This is called secondary emission.

The velocity or voltage at which secondary electrons are emitted depends on the nature of the surface from which the electrons are emitted and the velocity of the bombarding electrons will also be a controlling factor in determining the quantity of released secondary electrons.

It will be seen, therefore, that the electron beam 15 will produce at the point of intersection with secondary emissive electrode 17 a group of secondary electrons which form an electron image of the scanning raster.

A device called the image tube has been developed which will convert an electron image into an optical image.

The operation of an image tube has been outlined in detail beginning on page 385 of the "RCA Review" for September, 1946. The image tube consists of a photo cathode, a fluorescent screen and an electron lens system contained in an evacuated glass envelope. When an image is focused on its photo cathode, electrons are emitted from it with a density distribution which corresponds to the distribution of illumination on the photo cathode. These electrons are accelerated and focused by an electron lens into an image which impinges upon the associated fluorescent screen. Here the energy contained in the speed of the electrons is converted into visible light, thus reproducing the image focused on the photo cathode.

The electron lens system employed in the image tube is comparable in many respects to an optical lens system. It consists of a series of coaxial cylinders with various potentials applied as indicated, for example, in the image tube section of tube 11 shown in Figure 1 as cylinders 20.

By controlling the flow of electrons from the secondary emissive electrode 17 to its associated luminescent screen 23 with a video signal, an image may be produced on the luminescent screen 23 from a blank scanning raster projected on the electrode 17, if the system is maintained in synchronism with the image pickup system. The image produced on luminescent screen 23 may be viewed directly or projected as illustrated to screen 25 through a lens system 28.

The modulation of the electron flow from the secondary emissive electrode 17 to the associated luminescent screen 23 is accomplished by providing an electrode 27 maintained at a substantially constant potential such as ground potential, as illustrated in Figure 1, in combination with a variable potential applied to secondary emissive electrode 17. The quantity of electrons passing from the secondary emissive electrode 17 to the luminescent screen 23 will be governed by the difference in potential between the secondary emissive electrode 17 and the electrode 27. If, for example, the potential of the secondary emissive electrode 17 is negative with respect to the potential of the electrode 27, the electrons will be attracted away from the secondary emissive electrode 17 and pass through the mesh of the electrode 27 to the luminescent screen 23. If, however, the potential of the secondary emissive electrode 17 is positive with respect to the potential of electrode 27, the secondary electrons will be repelled by electrode 27.

It will be seen, therefore, that the transmitted television image may be reconstructed on the luminescent screen 23 by varying the potential of the secondary emissive electrode 17 in accordance with the video signals obtained from video amplifier 3.

In Figure 2, there is shown still another preferred form of this invention involving the image tube electron flow modulation principle explained under Figure 1 above, however, the secondary emissive electrode 31 of tube 33 is so constructed that it contains a plurality of miniature parallel elements, every third, one, for example, being connected together, as illustrated.

The size and spacing of the individual elements in the structure of the secondary emissive electrode 31 must be indistinguishable to the unaided eye in order to perform its function properly. Screens of this nature have been constructed, and by way of example, one way to provide such a structure as shown is to evaporate a conductive material through a mask on an insulating sheet.

Tube 33 contain an electron gun structure 35 and appropriate electron beam deflecting coils 37 and 39.

There is also contained in tube 33 and electrode 41 positioned between the secondary emissive electrode 31 and a luminescent screen 43 and connected to a substantially constant potential such as ground, as illustrated. The electron lens of tube 33 is provided by the elements 45.

Green signal channel 47 is connected to one set of the elements of the secondary emissive electrode 31, blue signal channel 49 is connected to another set of the elements of secondary emissive electrode 31, and red signal channel 51 is connected to the third set of elements of electrode 31.

It follows from the explanation of the operation of tube 11 in Figure 1 that when, for example, a negative signal is supplied to the elements of the secondary emissive electrode 31 connected to the green signal channel, and a positive potential is applied to the other elements connected to the blue signal channel 49 and the red signal channel 51, electrons will flow to the luminescent screen 43 only from that portion of the electron image formed by and adjacent the secondary emissive electrode 31, which is at a negative potential with respect to the control electrode 41 or the elements of the secondary emissive electrode 31, which are connected to the green signal channel 47.

There will, therefore, be projected on the luminescent screen 43 a series of vertical lines representative of the electron image adjacent the elements of secondary emissive electrode 31, which are connected to the green signal channel 47.

If, however, the incoming signal changes such that the blue signal channel 49 produces a negative signal with respect to the control electrode 41 and at the same time the green signal channel 47 and the red signal channel 51 both produce a signal positive with respect to the potential of the control electrode 41, a series of minute vertical lines will be produced on screen 43 which correspond in position to the elements of secondary emissive electrode 31 which are connected to the blue signal channel 49.

It follows that, if the luminescent screen 43 is composed of color producing phosphors or component color filters whose position and width correspond to the electron image produced adjacent the secondary emissive electrode 31, and whose colors correspond to the associated signal channels, a composite color image may be reproduced on the luminescent screen 43.

It often becomes desirable to control the intensity of the electron beam producing the scanning raster on secondary emissive electrode 31. This is accomplished by applying a signal to control electrode 53 through beam intensity control channel 55. The intensity of the beam may be controlled for purposes of blanking, or for purposes of supplementing the color image with a black and white image either of the same or different than that transmitted through the channel controlling the electron flow through the image tube.

Very often in practice the green signal channel 47 is employed for the transmission of synchronizing and blanking signals. This may be accomplished by connecting beam signal control channel 55 with the green signal channel 47.

The operation of the secondary emissive electrode or electron image forming device may be further explained by reference to Figure 3. Blocks 61 represent in greatly enlarged cross section the elements of the secondary emissive electrode 31 of Figure 2. Every third one of the blocks 61 is interconnected to each other to form, for example, a red system, a green system, and a blue system, as illustrated. A control electrode 63 is positioned adjacent the elements 61 and connected to ground.

If, for example, a negative signal with respect to ground is connected to the red elements, the electrons emitted from the elements will pass through the screen structure of the control electrode 63 on to the luminescent screen 65, as illustrated by the arrows. If a positive potential is applied to the green and blue elements as illustrated, the electrons emitted from the green and blue elements 61 will be repulsed and prevented from passing through the control electrode 63 to the luminescent screen 65, as illustrated by the curved arrows.

It follows that, if screen 65 is composed, as illustrated, of color producing phosphors or component color filters whose width corresponds to the width of the electron image of the elements 61 of the secondary emissive element and whose colors correspond to the associated signal channels, a color image may be reproduced on luminescent screen 65.

In Figure 4, there is shown still another preferred form of this invention wherein the electron gun structure 71 directs an electron beam at a secondary emissive electrode 73. The electron beam may be deflected, for example, by deflecting plates 75. The intensity of the electron beam may be controlled by control electrode 77.

An electrode 79 is positioned adjacent the secondary emissive electrode 73 and is connected to a video signal channel 81. There is provided a luminescent screen 83 which is adapted to reproduce optically the electron image formed adjacent the secondary emissive electrode 73 by reason of the electron lens system involving electrodes 85.

The preferred form of the invention shown in Figure 4 is characterized by the fact that the electron image of the scanning raster is formed on the same side of the secondary emissive electrode 73 as the position of the electron stream gun 71.

A small spot size for the scanning beam is to be preferred. Furthermore, the spot area may be made elliptical by proper beam focusing arrangement, the narrow dimension being in the direction of the line or rapid scanning motion.

Having thus described the invention, what is claimed is:

1. An image reproducing device comprising in combination an electrode to emit electrons from elemental areas thereof by secondary emission, said electrode having separate selective and intermingled groups of interpositioned, electrically interconnected and electrically conductive elemental areas extending across substantially all the area of said electrode, an electron lens system positioned in the path of said electrons, a luminescent screen having separate and intermingled groups of interpositioned elemental areas covering substantially all the area of said luminescent screen, and whose elemental areas are in substantial registry with the electron image of the corresponding elemental areas of said electrode, a conductive grid positioned between said electrode and said screen, said grid connected to a point of fixed potential, means for developing a scanning raster on said electrode, and means connected to said electrode to control the magnitude of flow of electrons independently from each group of elemental areas of said electrode to the corresponding group of elemental areas of said luminescent screen.

2. A color image reproducing device comprising in combination electrode means to emit electrons upon electronic bombardment, said electrode means consisting of separate component color representative and intermingled groups of sequentially interpositioned, electrically interconnected and electrically conductive strip shaped elemental control areas extending across substantially all the area of said electrode means, an electron lens system, positioned adjacent said electrode means, a ruled luminescent screen consisting of separate groups of strips, each group consisting of different colors and being in substantial registry with the electron image of the corresponding representative color group of said electrode means, means for developing a scanning raster on said electrode means, means to control the magnitude of the flow of electrons from each group of elemental areas of said electrode means to the corresponding group of elemental areas of said luminescent screen, and means connected to said electron flow magnitude control means to vary the potential applied thereto to construct an intelligence image on said luminescent screen.

3. A color image reproducing device comprising in combination means to emit electrons from elemental areas only upon electronic bombardment of said elemental areas and having associated therewith separate component color representative and intermingled groups of sequentially interpositioned, electrically interconnected and electrically conductive strip shaped elemental areas extending across substantially all the area of said electron emissive means, an electron lens system positioned in the path of said electrons, a substantially white light producing luminescent screen, and a ruled color filter associated therewith the consisting of strips of different color components in substantial registry with the electron image of the corresponding color representative elements associated with said electron emissive means, means for developing a scanning raster on said electron emisssive means, means to control the magnitude of the flow of electrons from each group of elemental areas of said electron emissive means to the corresponding group of elemental areas of said luminescent screen, and means connected to said electron flow magnitude control means to vary the potential applied thereto to construct an intelligence image on said luminescent screen.

4. In a television system, an image reproducing device comprising in combination a secondary electron emissive element, an electron lens system, a luminescent screen, said electron lens system positioned between said secondary emissive element and said luminescent screen, means for bombarding said secondary electron emissive element with an electron beam to form a blank scanning raster on said element, an electrode positioned between said secondary electron emissive element and said luminescent screen to control the magnitude of the flow of electrons from said secondary electron emissive element to said luminescent screen upon a change in the potential of said electrode with respect to the potential of said secondary electron emissive element, and means connected between said electrode and said secondary electron emissive element to vary the potential therebetween to construct an intelligence image on said luminescent screen.

5. In a television system, an image reproducing device comprising in combination an element to produce electrons by secondary emission upon electronic bombardment, an electron lens system positioned in said image reproducing device, a luminescent screen, means for developing a blank scanning raster on said cathode, a control electrode positioned between said cathode and said luminescent screen to control the magnitude of the flow of electrons from said cathode to said luminescent screen upon a change in control electrode potential relative to the potential of said cathode, and means connected to said control electrode to vary the potential applied thereto.

6. In a television system, an image reproducing device comprising in combination a secondary electron emissive cathode, an electron lens system positioned adjacent said secondary electron emissive cathode, a luminescent screen, means for developing an electron image of a blank scanning raster adjacent said cathode, a control electrode positioned between said cathode and said luminescent screen, means for maintaining said control electrode at substantially a constant potential, and means connected to said cathode to vary the average potential of said cathode.

7. In a television system, an image reproducing device comprising in combination a secondary emissive cathode, an electron lens system, a luminescent screen, said electron lens positioned between said cathode and screen, means for developing a blank scanning raster in the form of an electron image adjacent said cathode, a control electrode positioned between said cathode and said luminescent screen, means for maintaining said control electrode at a predetermined potential, said cathode having as a part thereof a plurality of separate electrically insulated elemental areas, each to control the magnitude of the flow of electrons from said cathode to said luminescent screen, and means connected to each of said elemental areas of said cathode to vary the potential applied thereto to construct an intelligence image on said luminescent screen.

8. In a television system, an image reproducing device comprising in combination a secondary emissive element comprising a plurality of separate electrically conductive electrodes, an electron lens system cooperatively positioned with said secondary emissive element, a luminescent screen, means for developing a blank scanning raster on said cathode, a control electrode positioned between said cathode and said luminescent screen, separate control means connected to each of said electrodes of said cathode and means for applying a component signal representative of a portion of an intelligence image to said control means to vary the potential applied to said electrodes to control in combination with said control electrode the magnitude of the flow of electrons from said cathode to said luminescent screen.

9. In a color television system, an image reproducing device comprising in combination a cathode element to develop adjacent thereto an electronic image of a scanning raster by secondary emission upon bombardment of said cathode element by an electron stream, an electron lens system positioned in said electron stream, a luminescent screen, a control electrode positioned between said cathode and said luminescent screen, means for maintaining said control electrode at a substantially constant potential, said cathode having as a part thereof a plurality of separate electrodes, each separate electrode having elements positioned sequentially and extending across substantially all the area of said cathode, and separate signal channels connected to each group of said electrodes of said cathode, and each separate signal channels passing a component signal represenative of a component color of a color image.

10. An image reproducing device for converting image signals into images comprising in combination a secondary electron emissive electrode, a luminescent screen, an auxiliary electrode and an electron lens positioned between said secondary electron emissive electrode and said screen, said auxiliary electrode arranged to be connected to a point of substantially constant potential, means for developing a scanning raster on said secondary electron emissive electrode, and a terminal for applying said signals to said secondary emissive electrode.

11. An image reproducing device for converting color image signals into color images comprising in combination a secondary electron emissive electrode composed of a plurality of groups of selected component color representative sections, a luminescent screen composed of groups of selected component color reproducing sections corresponding to the groups of sections of said secondary electron emissive electrode and whose sections are in substantial electronic registry with the corresponding color representative sections of said sectional electrode means, an auxiliary electrode and an electron focusing coil positioned between said sectional secondary electron emissive electrode and said luminescent screen, said auxiliary electrode connected to a point of fixed potential, means for developing a scanning raster on said secondary electron emissive electrode, and means for applying said color signals to their corresponding color representative section of said sectional secondary electron emissive electrode.

GEORGE C. SZIKLAI.

REFERENCES CITED

The following references are of record in the file of this patent:

UNITED STATES PATENTS

| Number | Name | Date |
| --- | --- | --- |
| 2,296,908 | Crosby | Sept. 29, 1942 |
| 2,307,188 | Bedford | Jan. 5, 1943 |
| 2,307,209 | George | Jan. 5, 1943 |
| 2,343,825 | Wilson | Mar. 7, 1944 |
| 2,354,263 | Hillier | July 25, 1944 |
| 2,408,050 | De Rosa | Sept. 24, 1946 |
| 2,446,440 | Swedlund | Aug. 3, 1948 |
| 2,461,515 | Bronwell | Feb. 15, 1949 |